(12) United States Patent
Kato (10) Patent No.: US 9,718,413 B2
(45) Date of Patent: Aug. 1, 2017

(54) VEHICLE UPPER BACK PANEL STRUCTURE

(71) Applicant: TOYOTA JIDOSHA KABUSHIKI KAISHA, Toyota-shi, Aichi-ken (JP)

(72) Inventor: Hiroyuki Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/990,421

(22) Filed: Jan. 7, 2016

(65) Prior Publication Data

US 2016/0236627 A1    Aug. 18, 2016

(30) Foreign Application Priority Data

Feb. 13, 2015 (JP) ................. 2015-026757

(51) Int. Cl.
| | |
|---|---|
| *B60R 11/00* | (2006.01) |
| *B60R 11/02* | (2006.01) |
| *B60N 2/28* | (2006.01) |
| *B60R 13/02* | (2006.01) |

(52) U.S. Cl.
CPC ........ *B60R 11/0217* (2013.01); *B60N 2/2887* (2013.01); *B60R 13/0268* (2013.01); *B60R 2013/0287* (2013.01)

(58) Field of Classification Search
CPC ............ B60R 11/0217; B60R 13/0268; B60N 2/2887
USPC ...................................... 296/37.16
See application file for complete search history.

(56) References Cited

U.S. PATENT DOCUMENTS

| 7,556,302 B2* | 7/2009 | Sakai ..................... B60R 5/044 |
| | | 181/150 |
| 2007/0075568 A1* | 4/2007 | Kim .................... B60R 11/0217 |
| | | 296/193.08 |
| 2015/0076865 A1* | 3/2015 | Pohl ....................... B60N 2/289 |
| | | 296/193.07 |

FOREIGN PATENT DOCUMENTS

| JP | S60-149476 U | 10/1985 |
| JP | H09-142222 A | 6/1997 |
| JP | 2001080428 A | 3/2001 |
| JP | 2007099132 A | 4/2007 |
| JP | 2010228617 A | 10/2010 |
| JP | 2012111308 A | 6/2012 |
| JP | 2012245803 A | 12/2012 |

\* cited by examiner

*Primary Examiner* — Joseph D Pape
(74) *Attorney, Agent, or Firm* — Oliff PLC (57) ABSTRACT

The present disclosure provides a vehicle upper back panel structure including: an upper back panel, provided at a rear section of a vehicle, that is formed in a rectangular plate shape with a length direction along a vehicle width direction in vehicle plan view, that is fixed to a vehicle body at end portions on both vehicle width direction sides by respective fixing portions, and that includes a horizontal wall section disposed horizontally between the fixing portions; and a front-rear direction bead that is formed continuously along a vehicle front-rear direction from a front end portion to a rear end portion of the horizontal wall section of the upper back panel, at a position including a central portion in the vehicle width direction between one of the fixing portions and the other of the fixing portions of the upper back panel.

4 Claims, 6 Drawing Sheets

VEHICLE UPPER BACK PANEL STRUCTURE

CROSS-REFERENCE TO RELATED APPLICATION

This application claims priority under 35 USC 119 from Japanese Patent Application No. 2015-026757, filed on Feb. 13, 2015, the disclosure of which is incorporated by reference herein.

BACKGROUND

Technical Field

The present disclosure relates to a vehicle upper back panel structure.

Related Art

Japanese Patent Application Laid-Open (JP-A) No. 2012-111308 describes an upper back panel (rear parcel shelf) structure. Specifically, an upper back panel that is installed to a rear section of a vehicle, partitions between a vehicle compartment and a luggage compartment. The upper back panel includes: a horizontal wall section disposed substantially horizontally; a speaker attachment hole for attaching a speaker; an anchor member disposed in front of the speaker attachment hole and for anchoring an anchor member of a child seat, and a patch provided at peripheral edges of the speaker attachment opening. A bead extending along the vehicle width direction at a position near the anchor member is formed to the patch. In general, when tension load toward the vehicle front-rear direction front side is applied through the anchor member, high stress is imparted in a localized manner to the peripheral edge of the speaker attachment opening, particularly at portions on both vehicle width direction sides. In this structure, the front bead formed to the patch disperses the tension load, thus avoiding a concentration of stress at the peripheral edge of the speaker attachment opening.

When the upper back panel vibrates in the vehicle up-down direction due to, for example, input from the road surface when the vehicle is travelling, a drop in the NV (Noise and Vibration) performance (vibration and vibration noise suppression performance) may occur. Accordingly, in order to suppress vibration of the upper back panel in the vehicle up-down direction, it is necessary to dispose a structure that increases the rigidity of the upper back panel at an optimal position. However, in the configuration described in JP-A No. 2012-111308, since front-rear direction beads that increase the rigidity of the upper back panel and that extend along the vehicle front-rear direction in shapes protruding toward the vehicle upper side, are formed adjacent on both sides of the anchor member attached at the vehicle width direction center, vibration of the upper back panel may not be suitably suppressed.

SUMMARY

The present disclosure provides a vehicle upper back panel structure that may improve NV performance of an upper back panel.

A vehicle upper back panel structure of the first aspect includes: an upper back panel, provided at a rear section of a vehicle, that is formed in a rectangular plate shape with a length direction along a vehicle width direction in vehicle plan view, that is fixed to a vehicle body at end portions on both vehicle width direction sides by respective fixing portions, and that includes a horizontal wall section disposed horizontally between the fixing portions; and a front-rear direction bead that is formed continuously along a vehicle front-rear direction from a front end portion to a rear end portion of the horizontal wall section of the upper back panel, at a position including a central portion in the vehicle width direction between one of the fixing portions and the other of the fixing portions of the upper back panel.

According to a second aspect, in the vehicle upper back panel structure of the first aspect, the front-rear direction bead may project out toward a vehicle up-down direction lower side with respect to the horizontal wall section, and may be formed with a bottom face that is further to the vehicle lower side than the horizontal wall section.

According to a third aspect, in the vehicle upper back panel structure of the second aspect, at the bottom face of the front-rear direction bead, a protrusion, that is lower than the horizontal wall section and that projects out toward the vehicle up-down direction upper side, may be formed at at least one of a front end portion or a rear end portion.

According to a fourth aspect, in the vehicle upper back panel structure of the second and third aspects, an anchor member that projects out toward the vehicle up-down direction upper side and that detachably anchors a child seat may be provided to a vehicle upper side face of the front-rear direction bead.

According to a fifth aspect, in the vehicle upper back panel structure of the above aspects, the upper back panel may be provided with: a speaker attachment portion for attaching a speaker; a terminal front-rear direction bead, provided at the vehicle width direction outside of the speaker attachment portion, that is formed continuously along the vehicle front-rear direction from the front end portion to the rear end portion of the horizontal wall section; and a step portion, extending along the vehicle width direction at at least one of the vehicle front-rear direction front side or the vehicle front-rear direction rear side of the speaker attachment portion, and projecting out toward either the vehicle up-down direction upper side or the vehicle up-down direction lower side with respect to the speaker attachment portion, and the front-rear direction bead may be provided at the vehicle width direction inside of the speaker attachment portion.

According to the first aspect, when the upper back panel vibrates in the vehicle up-down direction due to, for example, input from the road surface when the vehicle is travelling, since the end portions on both vehicle width direction sides are fixed to the vehicle body by the respective fixing portions, the amplitude becomes largest at the vehicle width direction central portion of the upper back panel between the one fixing portion and the other fixing portion. However, due to providing the front-rear direction bead formed continuously along the vehicle front-rear direction from the front end portion to the rear end portion at the position including the central portion, the front-rear direction bead acts as a beam of the upper back panel at the position where the amplitude is largest. Accordingly, the first aspect may increase the rigidity of the upper back panel, and may suppress vehicle up-down direction vibration of the upper back panel.

According to the second aspect, the front-rear direction bead projects out toward the vehicle lower side such that the bottom face is formed further to the vehicle lower side than the horizontal wall section. Namely, since the front-rear direction bead does not project out toward the vehicle upper side, the amount by which the upper back panel projects into the vehicle compartment in the vehicle up-down direction may be reduced. Accordingly, a design face of an interior member provided at the vehicle up-down direction upper side of the upper back panel may be configured in a shape with a small projection amount into the vehicle compartment. Thus, the second aspect may enable a larger space inside the vehicle compartment.

According to the third aspect, the protrusion that projects out toward the vehicle up-down direction upper side is formed to at least one out of the front end portion or the rear end portion on the bottom face of the front-rear direction bead. The protrusion is set lower than the horizontal wall section of the upper back panel. Namely, similarly to the front-rear direction bead, the protrusion projects out toward the vehicle up-down direction lower side with respect to the horizontal wall section of the upper back panel, and the depth of the protrusion is set shallower than that of the front-rear direction bead. In other words, the projection amount toward the vehicle lower side is smaller at the position where the protrusion is formed. In cases in which a flange is formed to least one out of the front end portion or the rear end portion of the front-rear direction bead by bending the upper back panel toward the vehicle lower side, generally, since displacement to the vehicle lower side to form the front-rear direction bead and displacement to the vehicle lower side to form the flange are concentrated in the at least one out of the front end portion or the rear end portion of the front-rear direction bead, cracks may occur at this position. However, in the third aspect, the amount of displacement toward the vehicle lower side required to form the front-rear direction bead may be made smaller due to the protrusion. Accordingly, the third aspect may suppress a concentration of deformation, and may suppress cracks from occurring.

According to the fourth aspect, the anchor member is attached to the vehicle upper side face of the front-rear direction bead. The vehicle up-down direction position of the anchor member is thereby a lower position than the horizontal wall section of the upper back panel. An interior member that covers the upper back panel is usually attached to the vehicle up-down direction upper side of the upper back panel, and an anchor cap, formed so as to be capable of opening and closing, is attached to the interior member, so as to enable access to the anchor member from the vehicle compartment side. The attachment position of the anchor cap is determined by the position of the anchor member, and thus, in a case in which the anchor member is disposed at a lower position, the anchor cap may also be disposed at a lower position. In a case in which the anchor cap is disposed at a lower position, a design face of the interior member to which the anchor cap attaches may also be set lower. Accordingly, the fourth aspect may increase in space inside the vehicle compartment.

According to a fifth aspect, the front-rear direction bead is formed on the vehicle width direction inside of the speaker attachment portion, and the terminal front-rear direction bead is provided on the vehicle width direction outside of the speaker attachment portion. The step portion is formed at at least one out of the vehicle front-rear direction front side or the vehicle front-rear direction rear side of the speaker attachment portion. The step portion projects out toward either the vehicle up-down direction upper side or the vehicle up-down direction lower side with respect to the speaker attachment portion. Accordingly, a ridge line is formed between the speaker attachment portion and the step portion. Namely, the speaker attachment portion is configured so as to be surrounded by the respective ridge lines of the front-rear direction bead, the terminal front-rear direction bead, the step portion, and either the front end portion or the rear end portion of the upper back panel. Accordingly, since the rigidity of the speaker attachment portion can be raised, the fifth aspect may suppress the vibration of the speaker attachment portion due to the vibration of the speaker itself arising from actuation of the speaker.

The vehicle upper back panel structure according to the first aspect may improve the NV performance of the upper back panel.

The vehicle upper back panel structure according to the second aspect may give a sense of spaciousness to an occupant inside the vehicle compartment.

The vehicle upper back panel structure according to the third aspect may improve ease of forming the upper back panel.

The vehicle upper back panel structure according to the fourth aspect may give an even greater sense of spaciousness to an occupant inside the vehicle compartment.

The vehicle upper back panel structure according to the fifth aspect may suppress vibration (chattering sound) of the upper back panel due to the speaker.

BRIEF DESCRIPTION OF THE DRAWINGS

Exemplary embodiments will be described in detail based on the following figures, wherein.

DETAILED DESCRIPTION

Explanation follows regarding a vehicle upper back panel structure according to a first exemplary embodiment, with reference to FIG. 1 to FIG. 5. In the drawings, the arrow FR indicates the vehicle front-rear direction front side, the arrow OUT indicates the vehicle width direction outside, and the arrow UP indicates the vehicle up-down direction upper side.

Figure 1:
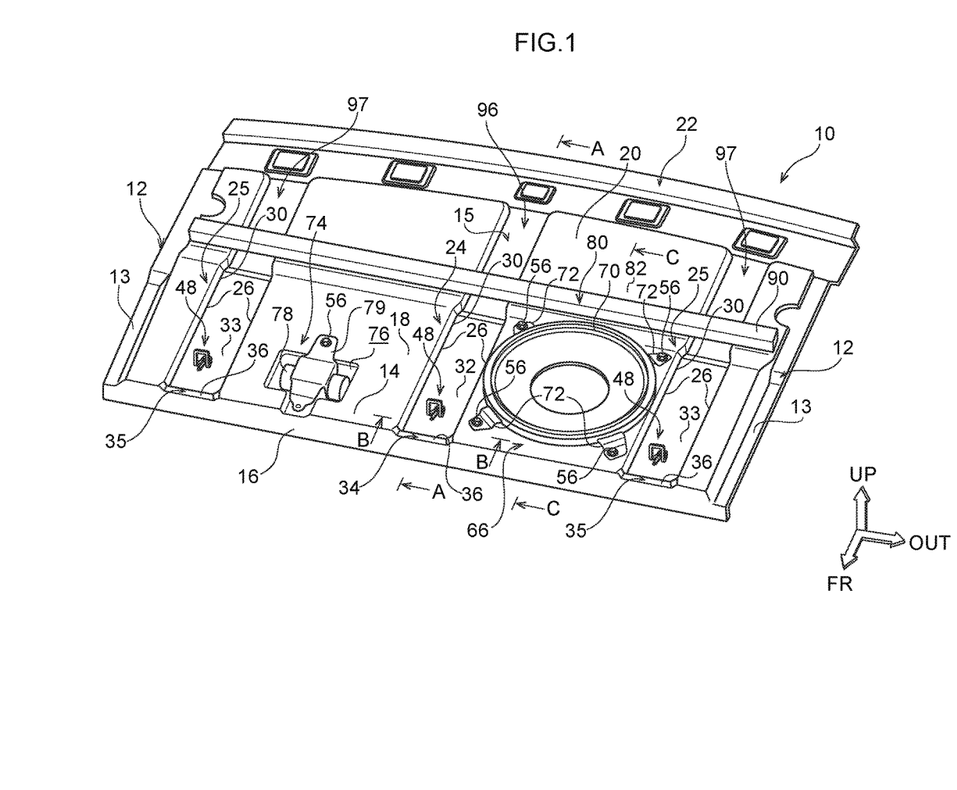
FIG. 1 is a perspective view illustrating an upper back panel provided with a vehicle upper back panel structure according to a first exemplary embodiment.

As illustrated in FIG. 1, an upper back panel 10 is provided in a vehicle rear section (not illustrated). The upper back panel 10 is formed in a rectangular plate shape in plan view of the vehicle, and is disposed with its length direction along the vehicle width direction. The upper back panel 10 is joined by welding to rear pillar inner panels or the like (not illustrated), at fixing portions 13 formed to end portions 12 on both vehicle width direction sides of the upper back panel 10. Accordingly, the vehicle compartment and a luggage compartment are partitioned by the upper back panel 10. Note that the upper back panel 10 may be formed not only in a completely rectangular shape, but also in shapes that are not completely rectangular, such as a shape curving to follow a rear windshield glass.

A flange 16 is provided at a front end portion 14 of the upper back panel 10. The flange 16 extends along the vehicle width direction, and is formed by bending a horizontal wall section 18 that is disposed horizontally between the fixing portions 13 of the upper back panel 10 toward the lower side in substantially the vehicle up-down direction at the front end portion 14 of the upper back panel 10. Note that the horizontal wall section 18 may be configured so as to be disposed not only completely horizontally, but also so as to be disposed in a somewhat inclined state.

A rear end extension portion 22 is provided at a rear end portion 20 of the horizontal wall section 18. The rear end extension portion 22 extends from the rear end portion 20 toward the vehicle rear side along the vehicle front-rear direction, and is configured with a substantially hat-shaped profile in cross-section taken orthogonally to the vehicle width direction.

A front-rear direction bead 24 is formed at substantially the center of the upper back panel 10 in the vehicle width direction, and more specifically at a position including a vehicle width direction central portion 15 between one of the fixing portions 13 and the other fixing portion 13. The front-rear direction bead 24 projects out from the horizontal wall section 18 of the upper back panel 10 toward the vehicle up-down direction lower side (see FIG. 4), and is formed spanning continuously from the front end portion 14 to the rear end portion 20 of the horizontal wall section 18 of the upper back panel 10. Specifically, the front-rear direction bead 24 is formed with a substantially U-shaped cross-section profile as taken orthogonally to the vehicle front-rear direction by a pair of side wall portions 26, and a bottom face 32. The bottom face 32 is formed running along the vehicle width direction further to the vehicle lower side than the horizontal wall section 18, so as to connect together lower end portions 30 of the side wall portions 26. The front-rear direction bead 24 is formed by pressing, and the vehicle up-down direction dimension of the front-rear direction bead 24 from the horizontal wall section 18 to the bottom face 32 is set to the maximum formable depth for the plate thickness of the upper back panel 10. Note that the vehicle width direction center of the upper back panel 10 and the vehicle width direction center of the front-rear direction bead 24 do not necessarily have to be the same as each other, and is sufficient that at least a portion of the front-rear direction bead 24 is disposed overlapping in the vehicle width direction with the vehicle width direction center of the upper back panel 10 in plan view of the vehicle.

In the vicinity of the end portions 12 on both vehicle width direction sides of the upper back panel 10, respective terminal front-rear direction beads 25 are formed spanning continuously from the front end portion 14 to the rear end portion 20 of the horizontal wall section 18, similarly to the front-rear direction bead 24. Namely, in the present exemplary embodiment, three beads are formed spanning continuously from the front end portion 14 to the rear end portion 20 of the horizontal wall section 18.

Figure 3:
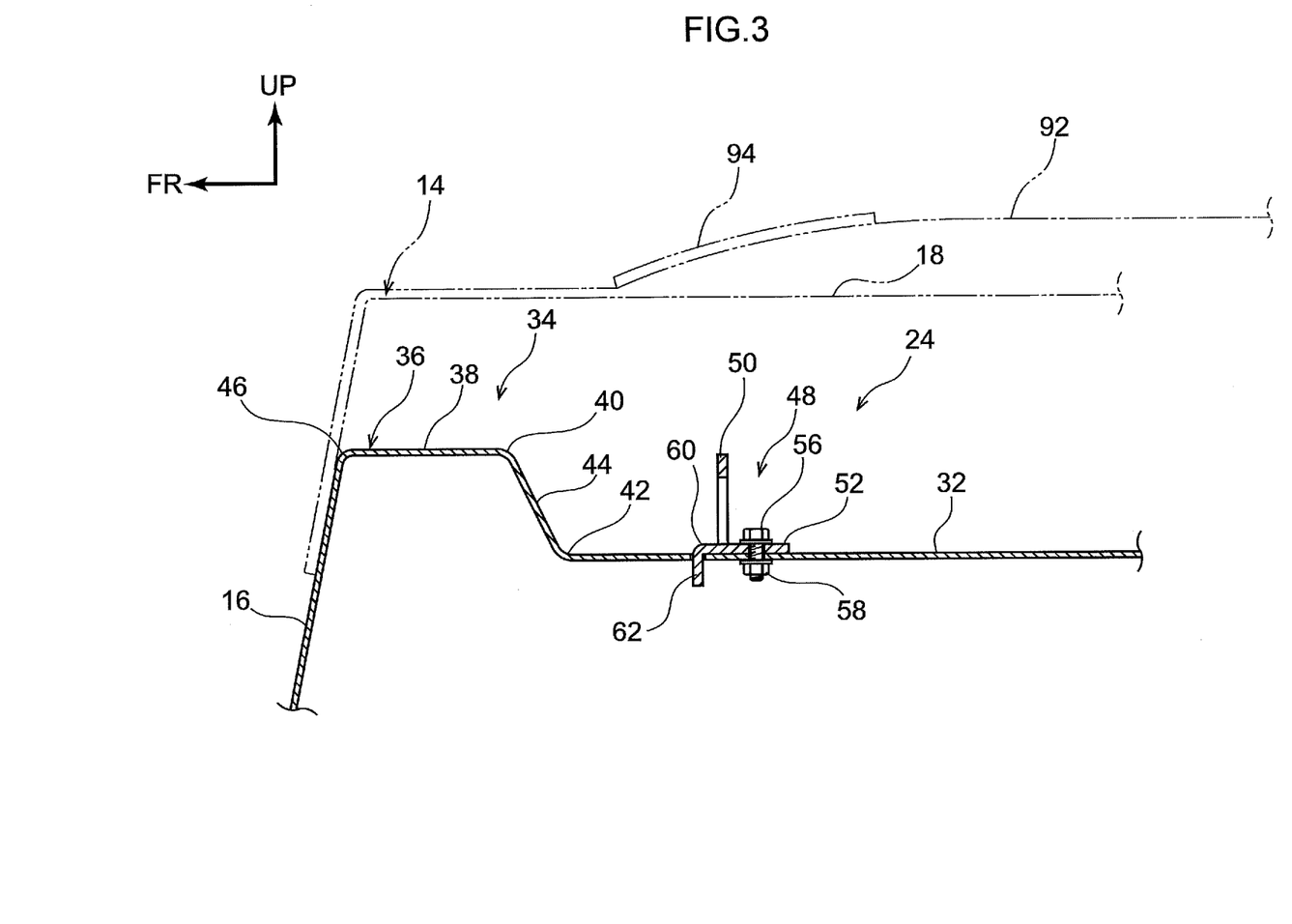
FIG. 3 is an enlarged cross-sectional view illustrating a state sectioned along line A-A in FIG. 1.
Figure 4:
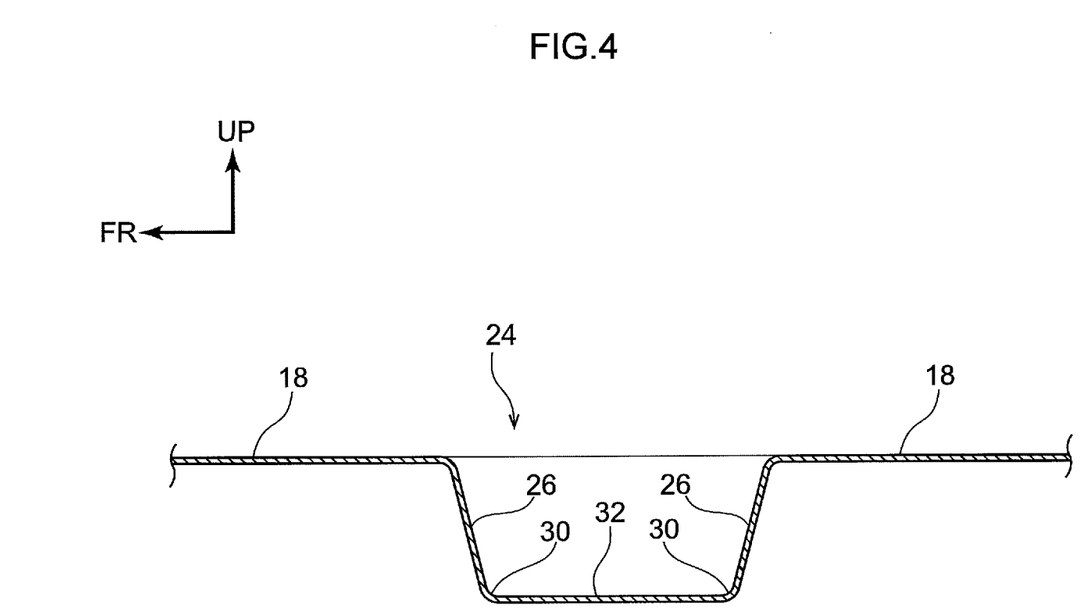
FIG. 4 is an enlarged cross-sectional view illustrating a state sectioned along line B-B in FIG. 1.

As illustrated in FIG. 3, a protrusion 36 is formed at a front end portion 34 of the bottom face 32 of the front-rear direction bead 24. The protrusion 36 is formed by a protrusion upper face 38 and a protrusion side face 44. More specifically, the protrusion upper face 38 extends parallel to the horizontal wall section 18 of the upper back panel 10 and is disposed at a position lower than the horizontal wall section 18 and at a position higher than the bottom face 32 of the front-rear direction bead 24. The protrusion side face 44 is formed so as to connect together a rear end 40 of the protrusion upper face 38 and a front end 42 of the bottom face 32 of the front-rear direction bead 24. A front end 46 of the protrusion 36 is joined continuously to the flange 16. Note that, in the present exemplary embodiment, a vehicle up-down direction dimension from the protrusion upper face 38 to the bottom face 32 is set at approximately ⅓ of the vehicle up-down direction dimension from the horizontal wall section 18 of the upper back panel 10 to the bottom face 32. Similarly, the protrusions 36 are also formed to front end portions 35 of bottom faces 33 of the respective terminal front-rear direction beads 25 formed in the vicinity of the end portions 12 on both vehicle width direction sides of the upper back panel 10.

Figure 2:
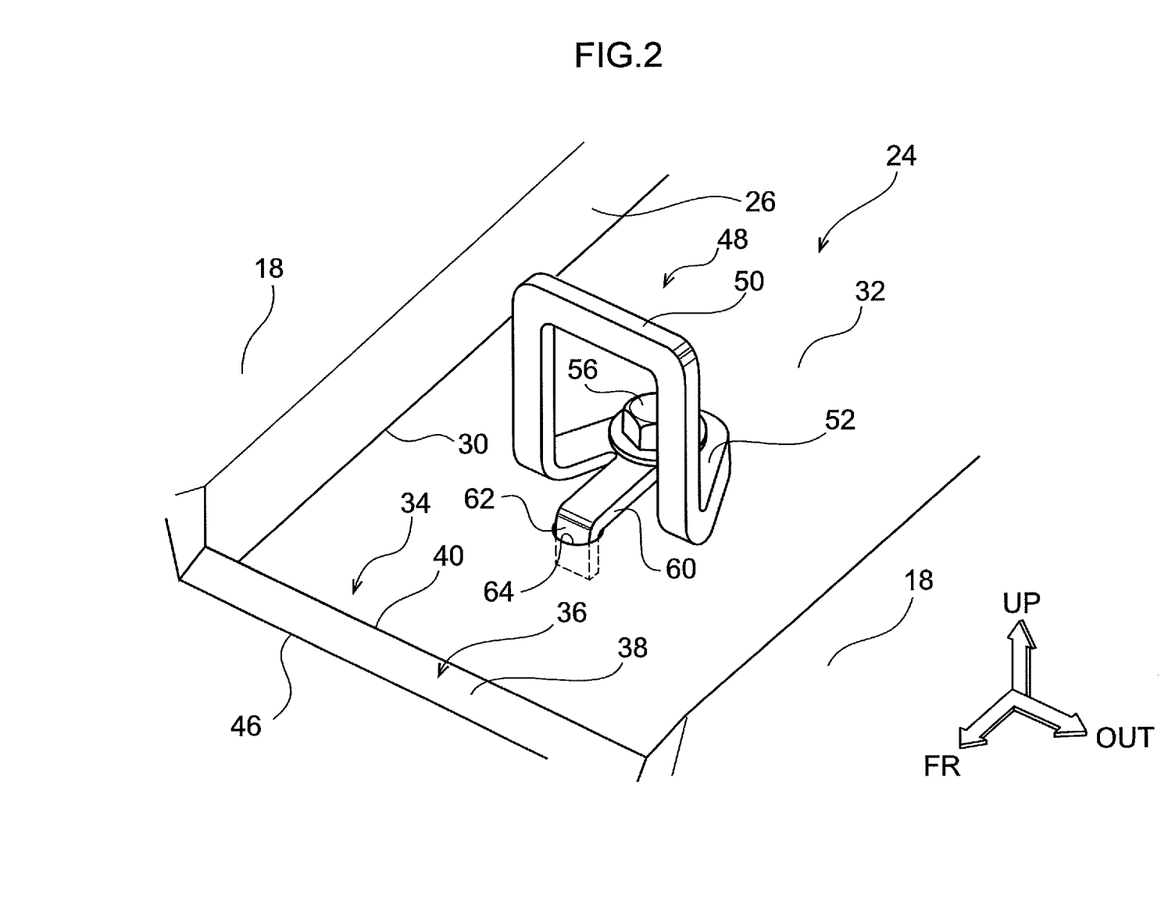
FIG. 2 is an enlarged perspective view illustrating an anchor member of an upper back panel provided with a vehicle upper back panel structure according to the first exemplary embodiment.

An anchor member 48, to which an anchor member of a child seat (not illustrated) detachably anchors, is attached to the bottom face 32 of the front-rear direction bead 24. As illustrated in FIG. 2, the anchor member 48 is configured by an anchor portion 50 that extends along the vehicle up-down direction and is formed in a substantially U-shape when looking at the vehicle face-on, and an attachment fixing portion 52 that is provided to a vehicle up-down direction lower side of the anchor portion 50 and extends along the vehicle front-rear direction. The anchor portion 50 is installed so as to open toward the vehicle up-down direction lower side.

The attachment fixing portion 52 is integrally formed to the anchor portion 50, and a fastening hole (not illustrated) is formed piercing through a substantially central portion of the attachment fixing portion 52 in the plate thickness direction. A bolt 56 is inserted through this fastening hole, and a fastening hole (not illustrated) formed to the bottom face 32 of the front-rear direction bead 24, and is fastened to a nut 58 (see FIG. 3) so as to fix the attachment fixing portion 52, and hence the anchor member 48, to the bottom face 32. Namely, the anchor member 48 is fixed in a state projecting out toward the vehicle up-down direction upper side. A rotation locking portion 60 extending along the vehicle front-rear direction is formed to a substantially central portion of the attachment fixing portion 52, and a bent portion 62 formed to a leading end of the rotation locking portion 60 and extending toward the vehicle up-down direction lower side is inserted into a rotation locking hole 64 formed in the bottom face 32. Accordingly, rotation of the anchor member 48 when the bolt 56 is being fastened is prevented.

As illustrated in FIG. 3, an interior member 92 that covers the upper back panel 10 is provided on the vehicle up-down direction upper side of the upper back panel 10. An anchor cap 94, which is formed so as to be capable of opening and closing, is attached to the interior member 92 so as to enable access to the anchor member 48 from the vehicle compartment side. The anchor cap 94 is provided at a vehicle up-down direction upper side of the anchor member 48. Namely, the vehicle up-down direction position of the anchor cap 94 is set at a position corresponding to the anchor member 48. At the same time, a design face of the interior member 92 to which the anchor cap 94 is attached is formed so as to match the position of the anchor cap 94.

As illustrated in FIG. 1, a speaker attachment portion 66 is formed between the front-rear direction bead 24 formed at the vehicle width direction center of the upper back panel 10 and one of the terminal front-rear direction beads 25 formed on the vehicle width direction outside (on the right side when the vehicle is viewed from the front). In the speaker attachment portion 66, a speaker hole 68 that penetrates through in the plate thickness direction is formed, and is disposed at the vehicle front-rear direction front side (see FIG. 5). A speaker 70 is inserted into the speaker hole 68 from the vehicle up-down direction upper side, and brackets 72 provided at the speaker 70 are fastened to the speaker attachment portion 66 using bolts 56. Accordingly, the speaker 70 is attached to the speaker attachment portion 66. Note that the speaker 70 includes a woofer or the like for generating low-pitch sounds.

A retractor attachment portion 74 is formed to the upper back panel 10 on the opposite side to the speaker attachment portion 66 in the vehicle width direction, namely, between the front-rear direction bead 24 formed at the vehicle width direction center and the terminal front-rear direction bead 25 formed at the vehicle width direction outside (the left side when the vehicle is viewed from the front). The retractor attachment portion 74 is disposed at the vehicle front-rear direction front side, and a retractor insertion hole 76 is formed penetrating through the retractor attachment portion 74 in the plate thickness direction. A seatbelt retractor 78 is attached to the retractor attachment portion 74 by inserting the seatbelt retractor 78 into the retractor insertion hole 76 from the vehicle up-down direction upper side and fastening an attachment bracket 79 provided to the seatbelt retractor 78 together with the retractor attachment portion 74 using a bolt 56.

Figure 5:
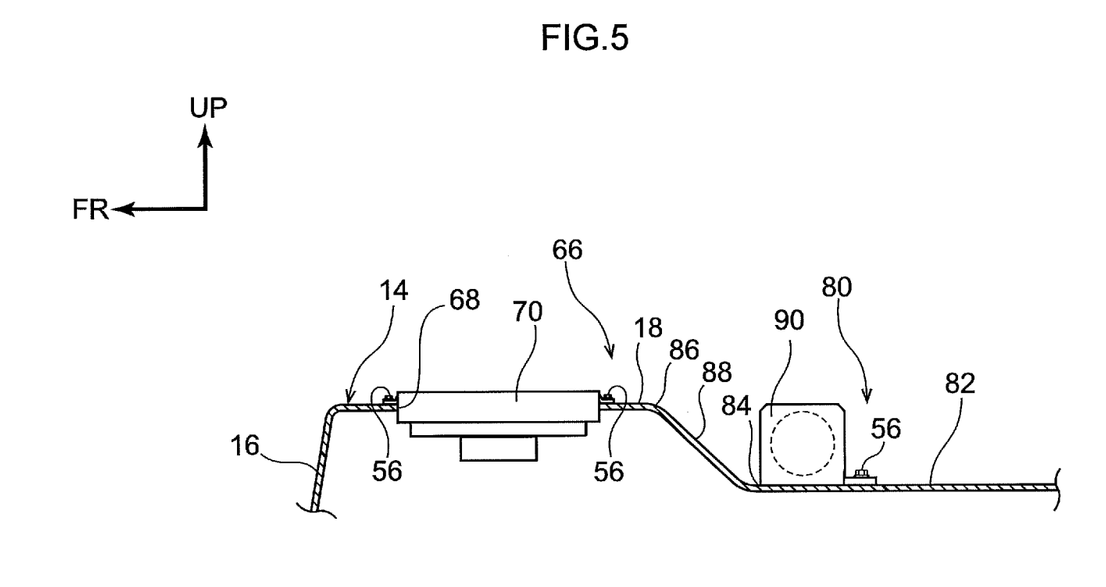
FIG. 5 is an enlarged cross-sectional view illustrating a state sectioned along line C-C in FIG. 1.

As illustrated in FIG. 5, a sunshade attachment portion 80, serving as a step portion, is formed to the upper back panel 10 along the vehicle width direction at the vehicle front-rear direction rear side of the speaker attachment portion 66. The sunshade attachment portion 80 is configured by a sunshade attachment mount face 82 disposed at a position lower than the horizontal wall section 18, and an attachment mount side face 88 coupling a front end portion 84 of the sunshade attachment mount face 82 together with a rear end portion 86 of the speaker attachment portion 66. Namely, a ridge line is formed at the rear end portion 86, between the speaker attachment portion 66 and the attachment mount side face 88. A sunshade 90, formed in a rectangular block shape with its length direction along the vehicle width direction, is coupled to a vehicle front-rear direction front side of the sunshade attachment mount face 82 using bolts 56 or the like.

Next, explanation follows regarding operation and function of the present exemplary embodiment.

Figure 6:
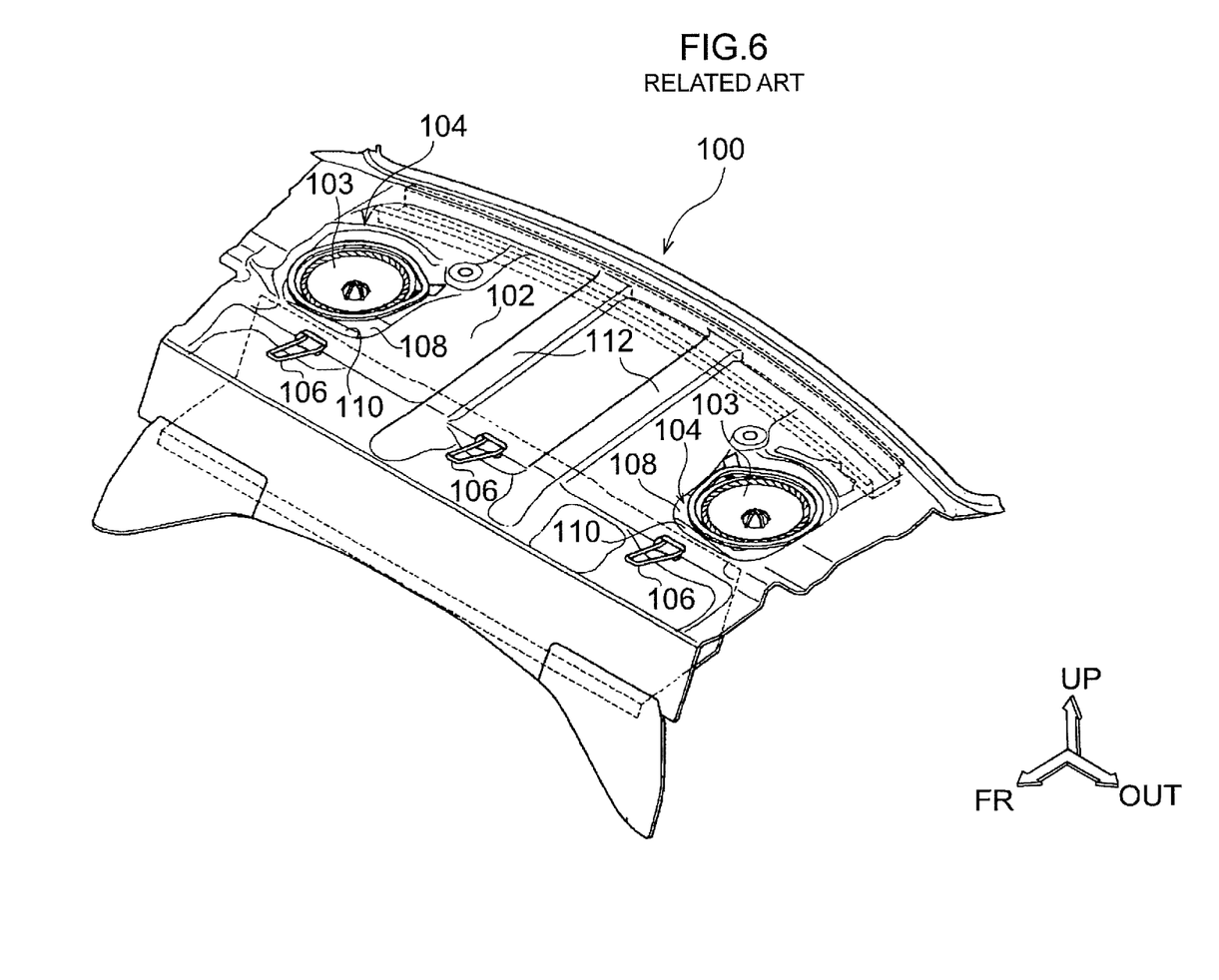
FIG. 6 is a perspective view illustrating an upper back panel according to a comparative example.

Here, explanation is given regarding operation and function of the present exemplary embodiment with reference to a comparative example illustrated in FIG. 6.

As illustrated in FIG. 6, an upper back panel 100 includes a horizontal wall section 102 disposed substantially horizontally in the vehicle, speaker attachment portions 104 for attaching speakers 103, anchor members 106 that are disposed at the vehicle width direction center and in front of the speaker attachment portions 104 for anchoring the anchor members of the child seat, and patches 108 provided at peripheral edges of the speaker attachment portions 104. The patches 108 are each formed with a front bead 110 extending along the vehicle width direction at a position close to the respective anchor members 106. In general, when tension load in the vehicle front-rear direction is applied through the anchor members 106, high stress is applied locally to the peripheral edges of the speaker attachment portions 104, particularly at portions on both vehicle width direction sides. In the present structure, the front bead 110 formed to the patch 108 disperses the tension load, and thus, avoids concentration of stress at the peripheral edges of the speaker attachment portions 104.

However, when the upper back panel 100 vibrates in the vehicle up-down direction due to, for example, input from the road surface when the vehicle is travelling, the amplitude becomes largest at the vehicle width direction center of the upper back panel 100, and a drop in the NV performance may occur, since the vehicle width direction end portions of the upper back panel 100 are fixed to the vehicle body. Accordingly, in order to suppress the vibration of the upper back panel 100 in the vehicle up-down direction, it is necessary to dispose a structure that increases the rigidity of the upper back panel 100 at an optimal position. However, in the configuration of the comparative example, since front-rear direction beads 112 that increase the rigidity of the upper back panel 100 and that extend along the vehicle front-rear direction in shapes protruding toward the vehicle upper side, are formed on both sides adjacent to the anchor member 106 that is attached at the vehicle width direction center, vibration of the upper back panel 100 may not be suitably suppressed. Accordingly, in this regard, the configuration of the comparative example leaves room for improvement.

However, in the present exemplary embodiment, as illustrated in FIG. 1, since the front-rear direction bead 24 is formed continuously from the front end portion 14 to the rear end portion 20 of the horizontal wall section 18 and is disposed at a position including the central portion 15, the front-rear direction bead 24 acts as a beam of the upper back panel 10 at the position where the amplitude is largest. Accordingly, the present exemplary embodiment may increase the rigidity of the upper back panel 10, and may suppress the vehicle up-down direction vibration of the upper back panel 10. Thus, the present exemplary embodiment may improve the NV performance of the upper back panel 10.

Note that, generally, the brackets, the patches, and the like, are additionally provided in order to increases the rigidity of the upper back panel 10 and to suppress the vibration of the upper back panel 10. In order to increase rigidity of the upper back panel 10, the plate thickness of the upper back panel 10 may be increased. However, as described above, the present exemplary embodiment may suppress vibration of the upper back panel 10 by increasing the rigidity of the upper back panel 10. Accordingly, in the present exemplary embodiment, there is no need to add additional brackets, patches, or the like in order to suppress the vibration. Moreover, in the present exemplary embodiment, there is no need to increase the plate thickness of the upper back panel 10, and thus, may reduce the vehicle weight.

Moreover, the front-rear direction bead 24 projects out toward the vehicle lower side, such that the bottom face 32 is formed further toward the vehicle lower side than the horizontal wall section 18. Namely, in the present exemplary embodiment, since the front-rear direction bead 24 does not project out toward the vehicle upper side, the amount that the upper back panel 10 projects into the vehicle compartment in the vehicle up-down direction may be reduced. Accordingly, as illustrated in FIG. 3, the design face of the interior member 92 provided at the vehicle up-down direction upper side of the upper back panel 10 may be configured in a shape with a small projection amount into the vehicle compartment. Accordingly, the present exemplary embodiment may enable a larger space inside the vehicle compartment, and thus, may give a sense of spaciousness to an occupant inside the vehicle compartment.

The protrusion 36 projecting out toward the vehicle up-down direction upper side is formed at the front end portion 34 of the bottom face 32 of the front-rear direction bead 24. The protrusion 36 is set lower than the horizontal wall section 18 of the upper back panel 10. Namely, similarly to the front-rear direction bead 24, the protrusion 36 projects out toward the vehicle up-down direction lower side with respect to the horizontal wall section 18 of the upper back panel 10, and the depth of the protrusion 36 is set shallower than that of the front-rear direction bead 24. In other words, the projection amount toward the vehicle lower side is smaller at the position where the protrusion 36 is formed. In a case in which the flange 16 is formed at the front end portion 34 of the front-rear direction bead 24 by bending the upper back panel 10 toward the vehicle lower side, since displacement to the vehicle lower side to form the front-rear direction bead 24 and displacement to the vehicle lower side to form the flange 16 are concentrated at the front end portion 34, cracks may occur at this position. However, in the present exemplary embodiment, the displacement amount toward the vehicle lower side to form the front end portion 34 of the front-rear direction bead 24 is made smaller due to the protrusion 36. Namely, even when the front end portion 34 is deformed to form the flange 16, the amount of deformation required to form the front-rear direction bead 24 is made smaller. Accordingly, the present exemplary embodiment may suppress a concentration of deformation at the front end portion 34, and may suppress cracks from occurring. Thus, the present exemplary embodiment may improve ease of forming.

Moreover, the anchor member 48 is attached to the bottom face 32 of the front-rear direction bead 24. Accordingly, the vehicle up-down direction position of the anchor member 48 is a lower position than the horizontal wall section 18 of the upper back panel 10. As illustrated in FIG. 3, the interior member 92 that covers the upper back panel 10 is usually attached to the vehicle up-down direction upper side of the upper back panel 10. The anchor cap 94 that is formed so as to be capable of opening and closing is attached to the interior member 92 so as to enable access to the anchor member 48 from the vehicle compartment side. The attachment position of the anchor cap 94 is determined by the position of the anchor member 48. Accordingly, in a case in which the anchor member 48 is disposed at a lower position, the anchor cap 94 may also be disposed at a lower position. In a case in which the anchor cap 94 is disposed at a lower position, the design face of the interior member 92 to which the anchor cap 94 attaches may also be set lower, and thus, the present exemplary embodiment may increase in space inside the vehicle compartment. Thus, the present exemplary embodiment may give a greater sense of spaciousness to an occupant inside the vehicle compartment.

As illustrated in FIG. 1, the front-rear direction bead 24 is formed on the vehicle width direction inside of the speaker attachment portion 66, and one of the terminal front-rear direction beads 25 is provided on the vehicle width direction outside of the speaker attachment portion 66. The sunshade attachment portion 80 is formed on the vehicle front-rear direction rear side of the speaker attachment portion 66. The sunshade attachment portion 80 projects out toward the vehicle up-down direction lower side with respect to the speaker attachment portion 66, such that a ridge line is formed at the rear end portion 86 between the speaker attachment portion 66 and the sunshade attachment portion 80. Namely, the speaker attachment portion 66 is configured so as to be surrounded by respective ridge lines of the front-rear direction bead 24, the terminal front-rear direction bead 25, the rear end portion 86, and the front end portion 14 of the upper back panel 10. Accordingly, in the present exemplary embodiment, since the rigidity of the speaker attachment portion 66 may be raised, vibration of the speaker attachment portion 66 due to the vibration of the speaker 70 itself arising from actuating the speaker 70, may be suppressed. Thus, the present exemplary embodiment may suppress the vibration (chattering sound) of the upper back panel 10 due to the speaker 70.

Further, in the present exemplary embodiment, transmission of vibration to the seatbelt retractor 78 attached to the upper back panel 10 may be suppressed due to suppression of the vibration of the upper back panel 10 itself. Accordingly, the present exemplary embodiment may suppress generation of noise between the upper back panel 10 and the seatbelt retractor 78, and the generation of noise due to vibration within the seatbelt retractor 78. Namely, in the present exemplary embodiment, cushioning material or weights for suppressing noise generation in the seatbelt retractor 78 becomes unnecessary, and thus, the present exemplary embodiment may enable a reduction in cost and a reduction in vehicle weight.

In the present exemplary embodiment, a case in which the protrusions 36 are provided to the front end portion 34 of the front-rear direction bead 24 and the front end portions 35 of the terminal front-rear direction beads 25, has been described. However, there is no limitation thereto, and the protrusions 36 may be provided to a rear end portion 96 of the front-rear direction bead 24 and to rear end portions 97 of the terminal front-rear direction beads 25. Moreover, the protrusions 36 may be respectively provided to both the front end portion 34 and the rear end portion 96 of the front-rear direction bead 24, and respectively provided to both the front end portions 35 and the rear end portions 97 of the terminal front-rear direction beads 25.

In the present exemplary embodiment, a case in which the sunshade attachment portion 80, serving as a step portion, is provided projecting out toward the vehicle up-down direction lower side, has been described. However, configuration is not limited thereto, and the sunshade attachment portion 80 may be formed in a bead shape or the like. Moreover, the step portion may projects out toward the vehicle up-down direction upper side. Moreover, the step portion may not be provided at the vehicle front-rear direction rear side of the speaker attachment portion 66, and may be provided on the vehicle front-rear direction front side of the speaker attachment portion 66, or may be provided on both the vehicle front-rear direction front side and the vehicle front-rear direction rear side of the speaker attachment portion 66.

In the above present exemplary embodiment, a case in which the speaker attachment portion 66 is provided to the vehicle front-rear direction front side of the upper back panel 10, has been described. However, there is no limitation thereto, and the speaker attachment portion 66 may be provided to the vehicle front-rear direction rear side of the upper back panel 10. In such case, forming the step portion on the vehicle front-rear direction front side of the speaker attachment portion 66 as described above enables a configuration in which the speaker attachment portion 66 is surrounded by the respective ridge lines of the front-rear direction bead 24, the step portion, and the rear end portion 20 of the upper back panel 10. This configuration may increase the rigidity of the speaker attachment portion 66.

Explanation has been given above regarding an exemplary embodiment of the present disclosure. However, the present disclosure is not limited to the above, and obviously various modifications other than those described above may be implemented within a range not departing from the spirit of the disclosure.

What is claimed is:

1. A vehicle upper back panel structure comprising:
    an upper back panel, provided at a rear section of a vehicle, the upper back panel being formed in a rectangular plate shape with a length direction along a vehicle width direction in vehicle plan view, the upper back panel having one end and another end in the vehicle width direction, each of the one end and the other end having a fixing portion which is fixed to a body of the vehicle, and the upper back panel including a horizontal wall section disposed horizontally between the fixing portions; and a front-rear direction bead that is formed continuously along a vehicle front-rear direction from a front end portion to a rear end portion of the horizontal wall section of the upper back panel, the front-rear direction bead being formed at a position including a central portion in the vehicle width direction between (i) the fixing portion of the one end of the upper back panel and (ii) the fixing portion of the other end of the upper back panel, wherein the front-rear direction bead projects downward in a vehicle up-down direction from the horizontal wall section, and is formed with a bottom face that is disposed lower than the horizontal wall section in the vehicle up-down direction, and wherein, a protrusion is formed at at least one of a front end portion or a rear end portion of the bottom face, an upper end of the protrusion being disposed lower than the horizontal wall section in the vehicle up-down direction.

2. The vehicle upper back panel structure of claim 1, wherein an anchor member is provided at a vehicle upper side face of the front-rear direction bead, the anchor member projecting upward from the vehicle upper side face of the front-rear direction bead in the vehicle up-down direction, the anchor member is configured to detachably anchor a child seat.

3. The vehicle upper back panel structure of claim 1, wherein the upper back panel is provided with:

a speaker attachment portion for attaching a speaker;

a terminal front-rear direction bead, provided at the vehicle width direction outside of the speaker attachment portion, the terminal front-rear direction bead being formed continuously along the vehicle front-rear direction from the front end portion to the rear end portion of the horizontal wall section; and a step portion is formed at the vehicle front-rear direction rear side of the speaker attachment portion, the step portion extending along the vehicle width direction, and the step portion projecting downward in the vehicle up-down direction with respect to the speaker attachment portion, and wherein the front-rear direction bead is provided inside of the speaker attachment portion in the vehicle width direction.

4. The vehicle upper back panel structure of claim 1, wherein the front-rear direction bead projects downward from the horizontal wall section in a vehicle up-down direction, and is formed with a bottom face that is disposed lower than the horizontal wall section in the vehicle up-down direction, the horizontal wall section having a hole that is configured to receive a speaker.

* * * * *